United States Patent
Cunningham

(10) Patent No.: US 10,544,803 B2
(45) Date of Patent: Jan. 28, 2020

(54) METHOD AND SYSTEM FOR COOLING FLUID DISTRIBUTION

(71) Applicant: General Electric Company, Schenectady, NY (US)

(72) Inventor: Neil Fraser Cunningham, Pleasant Ridge, OH (US)

(73) Assignee: General Electric Company, Schenectady, NY (US)

( * ) Notice: Subject to any disclaimer, the term of this patent is extended or adjusted under 35 U.S.C. 154(b) by 264 days.

(21) Appl. No.: 15/489,033

(22) Filed: Apr. 17, 2017

(65) Prior Publication Data

US 2018/0298758 A1  Oct. 18, 2018

(51) Int. Cl.
*F04D 29/58* (2006.01)
*F02C 7/18* (2006.01)

(52) U.S. Cl.
CPC .............. *F04D 29/582* (2013.01); *F02C 7/18* (2013.01)

(58) Field of Classification Search
CPC .... F02C 7/18; F02C 6/08; F01D 11/24; F01D 25/24; F05D 2260/201; F04D 29/582; F04D 29/584; F04D 29/5853; F04D 29/522
See application file for complete search history.

(56) References Cited

U.S. PATENT DOCUMENTS

| | | |
|---|---|---|
| 4,268,221 A | 5/1981 | Monsarrat et al. |
| 4,329,114 A | 5/1982 | Johnston et al. |
| 6,035,929 A * | 3/2000 | Friedel ................... F01D 11/24 165/168 |
| 6,185,925 B1 | 2/2001 | Proctor et al. |
| 7,491,029 B2 | 2/2009 | Pezzetti, Jr. et al. |
| 7,597,537 B2 | 10/2009 | Bucaro et al. |
| 8,434,997 B2 | 5/2013 | Pinero et al. |
| 9,316,111 B2 | 4/2016 | Eleftheriou et al. |
| 9,341,074 B2 | 5/2016 | Schimmels et al. |
| 2010/0000200 A1 * | 1/2010 | Smith ..................... F01D 5/186 60/266 |
| 2012/0055165 A1 * | 3/2012 | Roldan-Posada ....... F01D 9/023 60/755 |
| 2012/0247112 A1 * | 10/2012 | Narcus ................... F01D 9/023 60/759 |

(Continued)

*Primary Examiner* — Arun Goyal
*Assistant Examiner* — Henry Ng
(74) *Attorney, Agent, or Firm* — Dority & Manning, P.A.

(57) ABSTRACT

A method of controlling a clearance gap in a rotatable machine and a cooling fluid distribution system are provided. The cooling fluid distribution system includes a component to be cooled having a body extending along a longitudinal centerline of the component and including a radially outer surface at least partially circumscribing the longitudinal centerline. A cooling fluid distribution duct assembly includes a cooling fluid distribution duct extending along and spaced from the radially outer surface for a predetermined length. An outlet hole extends through the cooling fluid distribution duct along a length of the cooling fluid distribution duct. A cooling runner channel is coupled in flow communication with the cooling fluid outlet hole and extends a distance away from the cooling fluid distribution duct toward the radially outer surface. A distal end of the cooling runner channel includes a plurality of cooling holes directed toward the radially outer surface.

20 Claims, 4 Drawing Sheets

(56) References Cited

U.S. PATENT DOCUMENTS

2015/0152743 A1* 6/2015 Luttenberg .............. F01D 11/20
                                                         415/1
2015/0337675 A1   11/2015 Suciu et al.
2016/0215648 A1    7/2016 Callaghan
2017/0145845 A1*   5/2017 Vetters .................... F01D 9/02

* cited by examiner

400 —↘

┌─────────────────────────────────┐
│ CHANNELING A FLOW OF COOLING FLUID │
│ THROUGH A COOLING FLUID DISTRIBUTION │
│ DUCT CIRCUMFERENTIALLY ABOUT A │——402
│ RADIALLY OUTER SURFACE OF AN ENGINE │
│ CASE, THE COOLING FLUID DISTRIBUTION │
│ DUCT THERMALLY SEPARATED FROM │
│ THE ENGINE CASE │
└─────────────────────────────────┘
                 │
┌─────────────────────────────────┐
│ CHANNELING THE FLOW OF COOLING FLUID │
│ RADIALLY INWARDLY TO THE RADIALLY │
│ OUTER SURFACE THROUGH A COOLING │
│ FLUID OUTLET SLOT EXTENDING THROUGH │
│ THE COOLING FLUID DISTRIBUTION DUCT │
│ AND ONE OR MORE COOLING RUNNER │——404
│ CHANNELS COUPLED IN FLOW │
│ COMMUNICATION TO THE COOLING FLUID │
│ OUTLET SLOT, THE COOLING FLUID │
│ DISTRIBUTION DUCT AND THE ONE OR MORE │
│ COOLING RUNNER CHANNELS ALIGNED │
│ AXIALLY │
└─────────────────────────────────┘

FIG. 4

METHOD AND SYSTEM FOR COOLING FLUID DISTRIBUTION

BACKGROUND

The field of the disclosure relates generally to gas turbine engines and, more particularly, to a method and system for cooling fluid distribution in gas turbine engines.

Many industrial components rely on a supply of relatively different temperature fluid for proper operation and/or extending a life of the component. Relatively cool air is often used to remove heat generated by the component or heat that is transferred to the component from other nearby components. A source of this relatively cool air is often separated from the component to be cooled by a distance that may be significant, and the route the relatively cool air must take to get to the component may be close to heat-generating components. Heat from these heat-generating components may be transferred to the flow of relatively cool air, raising its temperature and reducing the effectiveness of its cooling capability.

Insulating the conduit carrying the relatively cool air is a common remedy. However, simply adding insulation increases the weight of the conduit. Because of the complexity of the route the conduit must take and the proximity of the conduit to the heat-generating components, adding a layer of insulation may not even be feasible in many cases.

For example, in some cooling fluid distribution systems, such as typical Active Clearance Control (ACC) systems, cool air is ducted from the fan bypass stream under the core cowl, and to a system of manifold segments in close contact with the engine case. The manifold segments include headers that direct the ducted cool air axially to stages (typically two stages) of the turbine or compressor case. The ducted cool air is then directed into cooling runner channels that spray the cool air onto the hot engine case. Because the manifold segments, ducts, headers, and cooling runner channels are in close proximity to the hot engine case, the cool air picks up heat along the route and is not as effective at cooling the engine case as it could be.

BRIEF DESCRIPTION

In one aspect, a cooling fluid distribution system includes a component to be cooled having a body extending along a longitudinal centerline of the component and including a radially outer surface at least partially circumscribing the longitudinal centerline. A cooling fluid distribution duct assembly includes a cooling fluid distribution duct extending along and spaced from the radially outer surface for a predetermined length. A cooling fluid outlet hole extends through the cooling fluid distribution duct along a length of the cooling fluid distribution duct. A cooling runner channel is coupled in flow communication with the cooling fluid outlet hole and extends a distance away from the cooling fluid distribution duct toward the radially outer surface. A distal end of the cooling runner channel includes a plurality of cooling holes directed toward the radially outer surface.

Optionally, the radially outer surface includes a cooling fin including a base coupled to the radially outer surface and a distal end extending away from the body. Also optionally, at least some of the plurality of cooling holes are directed to the base of the cooling fin. The radially outer surface may include a plurality of cooling fins spaced axially and parallel with respect to each other. The cooling fluid distribution duct may include a plurality of cooling runner channels interdigitated with the plurality of cooling fins. In various embodiments, the cooling fluid distribution duct extends circumferentially about the body, spaced from the radially outer surface for a predetermined sector of a circumference of the body. Optionally, the cooling fluid distribution duct assembly includes a plurality of cooling fluid distribution ducts axially spaced with respect to each other. The cooling fluid distribution duct and the cooling runner channel may define a flow path with a bulk flow of fluid directed in a circumferential direction and a radially inward direction toward the radially outer surface. Optionally, the cooling fluid distribution duct and the cooling runner channel define a flow path with a bulk flow of fluid directed in other than an axial direction. The cooling fluid distribution duct may be spaced from the radially outer surface such that the cooling fluid distribution duct is thermally isolated from the radially outer surface.

In another aspect, a rotatable machine includes a rotor at least partially surrounded by an engine case. A clearance gap is defined between the rotor and a radially inner surface of the engine case. A method of controlling a clearance gap in the rotatable machine includes channeling a flow of cooling fluid through a cooling fluid distribution duct extending circumferentially about a radially outer surface of the engine case. The cooling fluid distribution duct is thermally separated from the engine case. The method also includes channeling the flow of cooling fluid radially inwardly to the radially outer surface through a cooling fluid outlet hole extending through the cooling fluid distribution duct and one or more cooling runner channels coupled in flow communication to the cooling fluid outlet hole. The cooling fluid distribution duct and the one or more cooling runner channels are aligned axially.

Optionally, the method also includes maintaining a predetermined spacing between the cooling fluid distribution duct and the engine case. Also optionally, the method further includes insulating the predetermined spacing between the cooling fluid distribution duct and the engine case using at least one of air, a foam, and an insulative blanket. The method may further include preventing an axial flow of cooling fluid through the cooling fluid distribution duct and the one or more cooling runner channels.

The radially outer surface may include one or more cooling fins extending radially outward from the radially outer surface, the one or more cooling fins including a base coupled to the radially outer surface and a distal end extending radially outwardly. The method may further include directing the flow of cooling fluid radially inwardly from the one or more cooling runner channels toward the base. The one or more cooling fins and cooling runner channels may be interdigitated and the method may further include directing the flow of cooling fluid radially inwardly from the one or more cooling runner channels toward a respective base of the one or more bases.

In yet another aspect, a gas turbine engine includes a core engine including an engine case and a rotor rotatable about a longitudinal centerline. The core engine includes a high pressure compressor (HPC), a combustor, and a high pressure turbine (HPT), the HPC and HPT coupled together through a high pressure (HP) shaft. The gas turbine engine also includes a cooling fluid distribution duct assembly including a cooling fluid distribution duct extending circumferentially along and spaced from a radially outer surface of at least one of the HPC and the HPT for a predetermined length. A cooling fluid outlet hole extends through a radially inner side of the cooling fluid distribution duct along a length of the cooling fluid distribution duct. The gas turbine engine further includes a cooling runner channel coupled in flow communication with the cooling fluid outlet hole that extends a distance away from the cooling fluid distribution duct toward the radially outer surface. A distal end of the cooling runner channel includes a plurality of cooling holes directed toward the radially outer surface.

Optionally, the gas turbine engine further includes a plurality of cooling fins extending radially outwardly from the radially outer surface and axially aligned with at least one of the HPC and the HPT. The cooling fins may be interdigitated with the cooling runner channels. Also optionally, an insulative material may be positioned between the cooling fluid distribution duct and the radially outer surface. The cooling fluid distribution duct assembly may be one of a plurality of cooling fluid distribution duct assemblies, each of the cooling fluid distribution duct assemblies associated with a respective stage of the at least one of the HPC and the HPT.

DRAWINGS

These and other features, aspects, and advantages of the present disclosure will become better understood when the following detailed description is read with reference to the accompanying drawings in which like characters represent like parts throughout the drawings, wherein:

FIG. 4 is a flowchart of a method of controlling a clearance gap in a rotatable machine.

Figure 1:
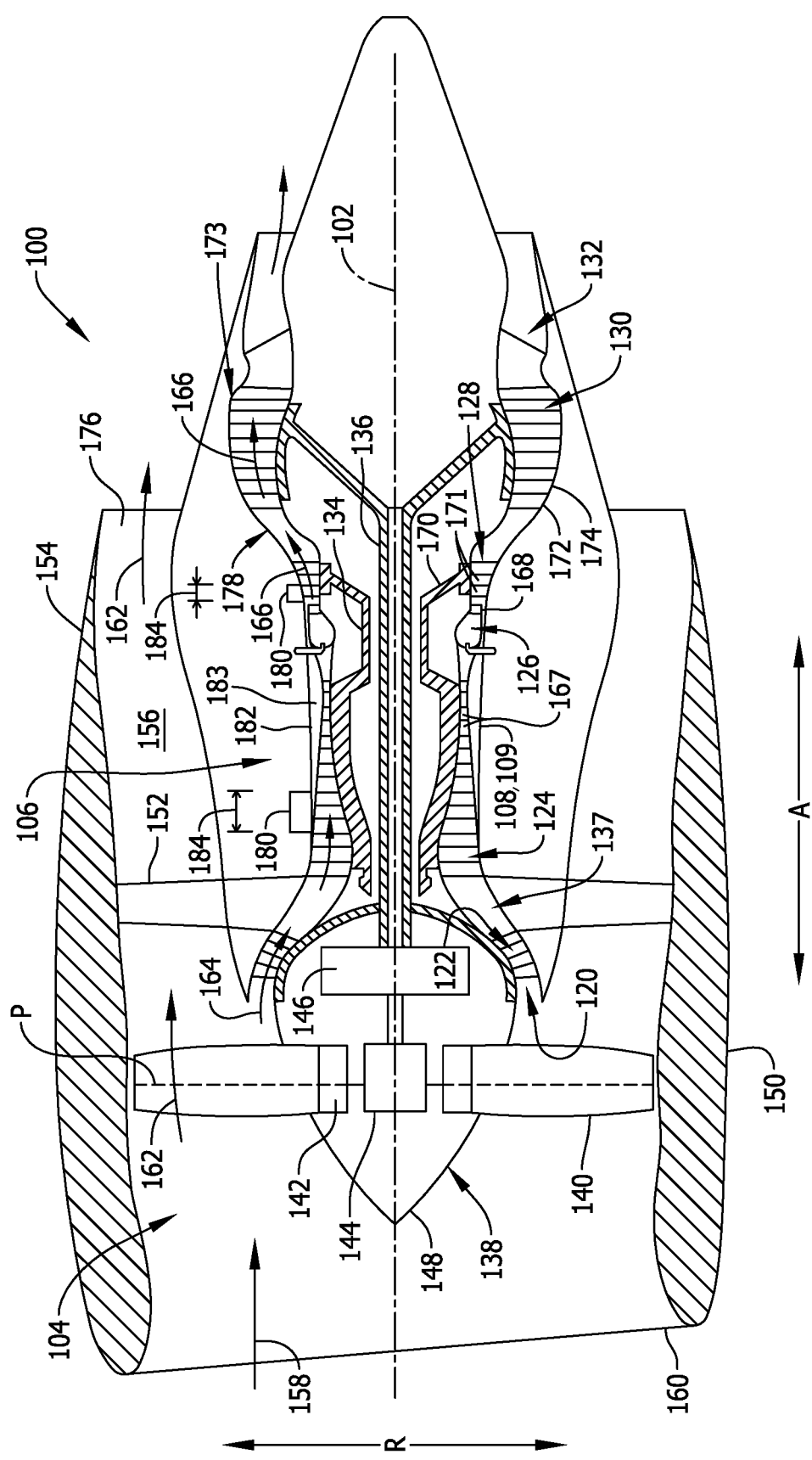
FIG. 1 is a schematic cross-sectional view of a gas turbine engine in accordance with an exemplary embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be needed for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a rotational axis or centerline of the body being described and are designated "A". Moreover, the terms "radial" and "radially" refer to directions and orientations that extend substantially orthogonal to the rotational axis or centerline of the body being described and are designated "R". In addition, as used herein, the terms "circumferential" and "circumferentially" refer to directions and orientations that extend arcuately about the rotational axis or centerline of the body being described and are designated "C".

Embodiments of the systems described herein provide a cost-effective system and method for providing cooling air to, for example, a cooling fluid distribution duct assembly of an active clearance control (ACC) system. The configuration of the cooling fluid distribution duct assembly ensures the relatively cool air is effective for its purpose when it arrives by avoiding contact between incoming cooling air and manifold surfaces that have become heated due to proximity to the turbine case. As described in more detail herein, the cooling fluid distribution duct assembly uses multiple localized plenums radially outward from each stage, and introduces cooling air into the cooling runner channel in a radial direction. In this way, contact between the cooling air and the hotter elements of the manifolds are minimized, increasing the efficiency of the cooling function by maintaining as much thermal differential between the cooling air and the case to be cooled as is possible, which in turn will realize a fuel saving advantage.

FIG. 1 is a schematic cross-sectional view of gas turbine engine 100 in accordance with an exemplary embodiment of the present disclosure. In the example embodiment, gas turbine engine 100 is embodied in a high-bypass turbofan jet engine. As shown in FIG. 1, gas turbine engine 100 defines an axial direction A (extending parallel to a rotational axis or longitudinal centerline 102 provided for reference) and a radial direction R. In general, gas turbine engine 100 includes a fan assembly 104 and a core engine 106 disposed downstream from fan assembly 104.

In the example embodiment, core engine 106 includes a component to be cooled 108, such as, but not limited to, an engine case 109 that defines an annular core engine inlet 120. Component to be cooled 108 at least partially surrounds, in serial flow relationship, a compressor section including a booster or low pressure compressor (LPC) 122 and a high pressure compressor (HPC) 124; a combustor 126; a turbine section including a high pressure turbine (HPT) 128 and a low pressure turbine (LPT) 130; and a jet exhaust nozzle 132. A high pressure (HP) spool or shaft 134 drivingly connects HPT 128 to HPC 124.

A low pressure (LP) spool or shaft 136 drivingly connects LPT 130 to LPC 122. The compressor section, combustor 126, turbine section, and jet exhaust nozzle 132 together define a core engine air flowpath 137.

In the example embodiment, fan assembly 104 includes a variable pitch fan 138 having a plurality of fan blades 140 coupled to a fan disk 142 in a spaced apart relationship. Fan blades 140 extend radially outwardly from fan disk 142. Each fan blade 140 is rotatable relative to fan disk 142 about a pitch axis P by virtue of fan blades 140 being operatively coupled to a suitable pitch change mechanism (PCM) 144 configured to vary the pitch of fan blades 140. In other embodiments, PCM 144 is configured to collectively vary the pitch of fan blades 140 in unison. Fan blades 140, fan disk 142, and PCM 144 are together rotatable about longitudinal centerline 102 by LP shaft 136 across a power gear box 146. Power gear box 146 includes a plurality of gears for adjusting the rotational speed of fan 138 relative to LP shaft 136 to a more efficient rotational fan speed.

Fan disk 142 is covered by rotatable front hub 148 aerodynamically contoured to promote an airflow through the plurality of fan blades 140. Additionally, fan assembly 104 includes an annular fan casing or outer nacelle 150 that circumferentially surrounds fan 138 and/or at least a portion of core engine 106. In the example embodiment, outer nacelle 150 is configured to be supported relative to core engine 106 by a plurality of circumferentially-spaced outlet guide vanes 152. Moreover, a downstream section 154 of outer nacelle 150 may extend over an outer portion of core engine 106 so as to define a bypass duct 156 therebetween.

During operation of gas turbine engine 100, a volume of air 158 enters gas turbine engine 100 through an associated inlet opening 160 of outer nacelle 150 and/or fan assembly 104. As volume of air 158 passes across fan blades 140, a bypass portion 162 of volume of air 158 is directed or routed into bypass duct 156 and a core engine portion 164 of volume of air 158 is directed or routed into core engine air flowpath 137, or more specifically into LPC 122. A ratio between bypass portion 162 and core engine portion 164 is commonly referred to as a bypass ratio. The pressure of core engine portion 164 is then increased as it is routed through HPC 124 and into combustor 126, where it is mixed with fuel and burned to provide combustion gases 166.

Combustion gases 166 are routed through HPT 128 where a portion of thermal and/or kinetic energy from combustion gases 166 is extracted via sequential stages 167 of HP turbine stator vanes 168 that are coupled to component to be cooled 108 and HP turbine rotor blades 170 that are coupled to HP spool or shaft 134, thus causing HP spool or shaft 134 to rotate, which then drives a rotation of HPC 124. Combustion gases 166 are then routed through LPT 130 where a second portion of thermal and kinetic energy is extracted from combustion gases 166 via sequential stages 171 of LP stator vanes 172 that are coupled to component to be cooled 108 and LP rotor blades 174 that are coupled to LP shaft 136, which drives a rotation of LP shaft 136 and LPC 122 and/or rotation of fan 138. A clearance gap 173 is defined between LP rotor blades 174 and a radially inner surface of engine case 109, and/or between HP turbine rotor blades 170 and the radially inner surface of engine case 109. In some embodiments, a size of clearance gap 173 is controlled via cooling of engine case 109 to facilitate efficient operation of HPT 128 and/or LPT 130.

Combustion gases 166 are subsequently routed through jet exhaust nozzle 132 of core engine 106 to provide propulsive thrust. Simultaneously, the pressure of bypass portion 162 is substantially increased as bypass portion 162 is routed through bypass duct 156 before it is exhausted from a fan nozzle exhaust section 176 of gas turbine engine 100, also providing propulsive thrust. HPT 128, LPT 130, and jet exhaust nozzle 132 at least partially define a hot gas path 178 for routing combustion gases 166 through core engine 106.

Component to be cooled 108, such as, but not limited to engine case 109 of HPC 124 and/or HPT 128, includes a body 183. A cooling fluid distribution system 180 extends circumferentially along and spaced from a radially outer surface 182 of body 183 for a predetermined length 184. In some embodiments, cooling fluid distribution system 180 extends axially for predetermined length 184 over at least a portion of HPT 128. Additionally or alternatively, cooling fluid distribution system 180 extends axially for predetermined length 184 over at least a portion of HPC 124. Each portion of cooling fluid distribution system 180 may extend for a different respective predetermined length 184. In certain embodiments, cooling fluid distribution system 180 is part of an Active Clearance Control (ACC) system. Additionally or alternatively, cooling fluid distribution system 180 delivers cooling fluid that maintains component to be cooled 108 at or below a threshold temperature.

Gas turbine engine 100 is depicted in the figures by way of example only. In other exemplary embodiments, gas turbine engine 100 may have any other suitable configuration including for example, a turboprop engine, a military purpose engine, and a marine or land-based aero-derivative engine.

Figure 2:
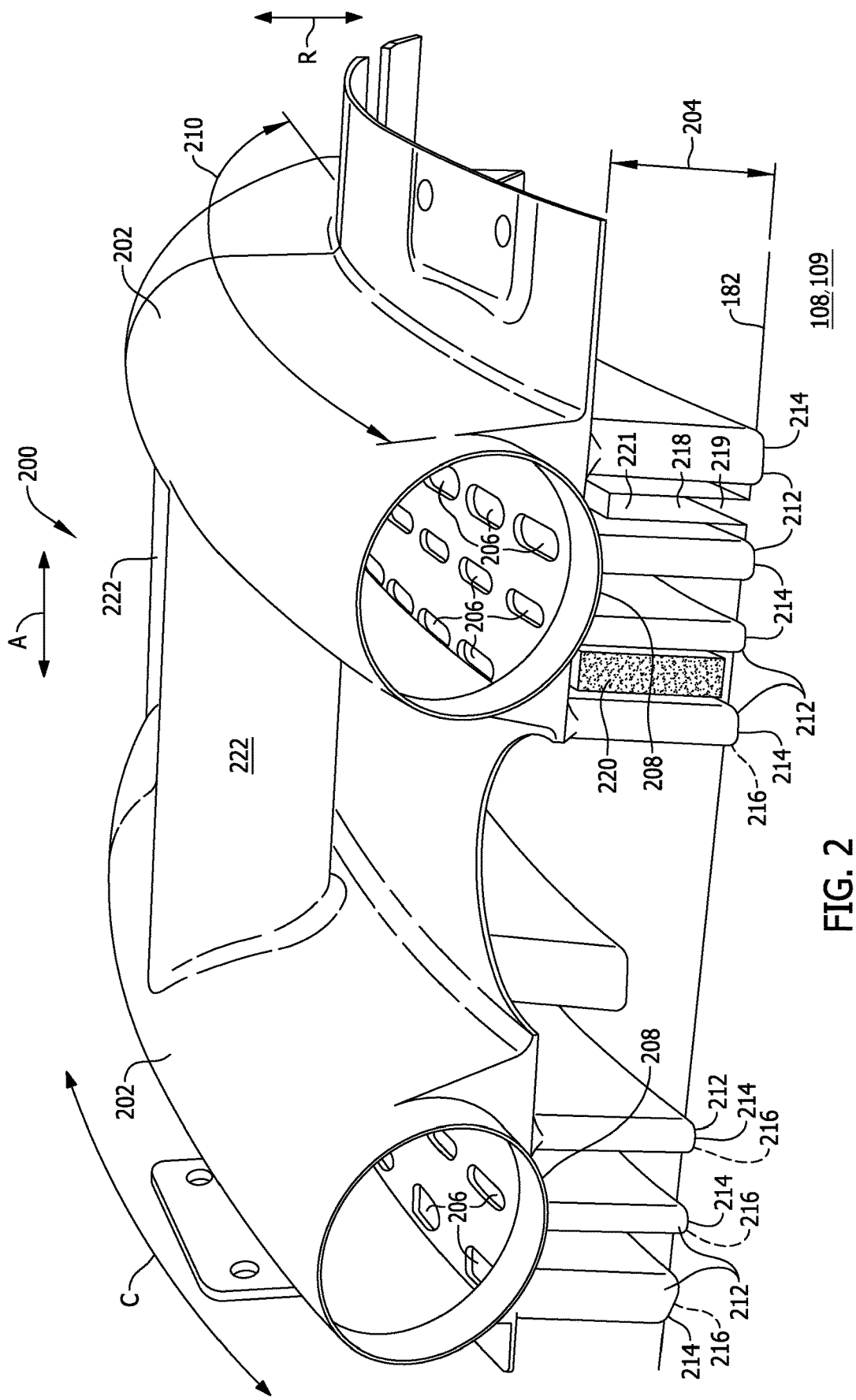
FIG. 2 is a perspective view of a cooling fluid distribution duct assembly that may be used with the cooling fluid distribution system shown in FIG. 1.
Figure 3:
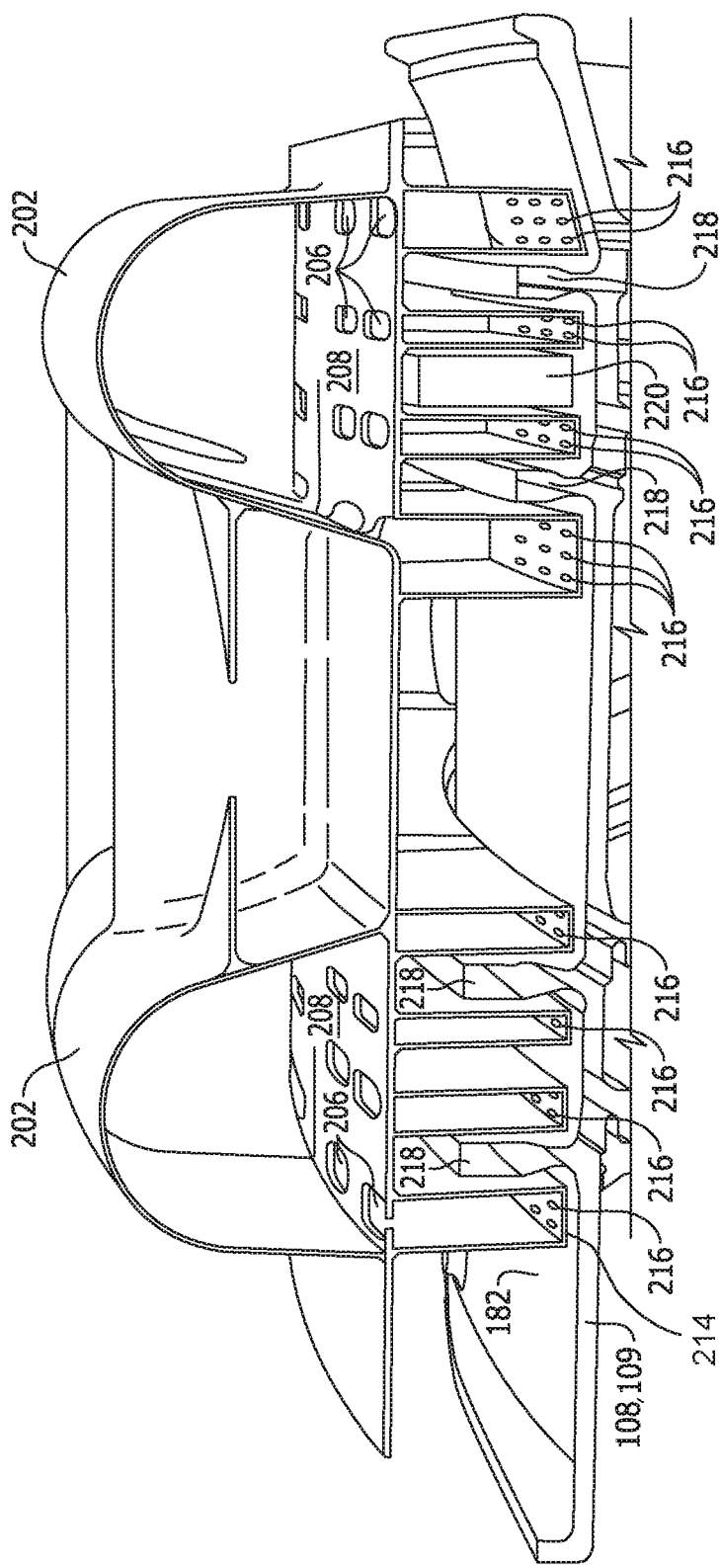
FIG. 3 is a side elevation view of the cooling fluid distribution duct assembly looking circumferentially.

FIG. 2 is a perspective view of a cooling fluid distribution duct assembly 200 that may be used with cooling fluid distribution system 180 (shown in FIG. 1). FIG. 3 is a side elevation view of cooling fluid distribution duct assembly 200 along circumferential direction C. In the example embodiment, cooling fluid distribution duct assembly 200 includes a cooling fluid distribution duct 202 extending circumferentially along, and spaced a stand-off distance 204 from, radially outer surface 182 of component to be cooled 108, such as, but not limited to, engine case 109 surrounding HPC 124 and HPT 128, for predetermined length 184.

A cooling fluid outlet hole 206 extends through a radially inner side 208 of cooling fluid distribution duct 202 along a length 210 of cooling fluid distribution duct 202.

A cooling runner channel 212 is coupled in flow communication with cooling fluid outlet hole 206 and extends stand-off distance 204 away from cooling fluid distribution duct 202 toward radially outer surface 182. A distal end 214 of cooling runner channel 212 includes a plurality of cooling holes 216 directed toward radially outer surface 182, such that cooling fluid exits cooling runner channel 212 through cooling holes 216 and impinges upon radially outer surface 182.

A plurality of cooling fins 218 extend radially outwardly from radially outer surface 182 that are axially aligned with HPC 124 and/or HPT 128. Each of plurality of cooling fins 218 include a base 219 coupled to radially outer surface 182 and a distal end 221 extending radially outwardly. In various embodiments, cooling fins 218 are interdigitated with cooling runner channels 212. An insulative material 220 is positioned, in some embodiments, between cooling fluid distribution duct 202 and radially outer surface 182.

In various embodiments, a respective cooling fluid distribution duct assembly 200 is associated with each stage of the at least one of HPC 124 and HPT 128. In some embodiments, one or more axially-oriented headers 222 extend between spaced-apart adjacent cooling fluid distribution ducts 202.

FIG. 4 is a flowchart of a method 400 of controlling a clearance gap in a rotatable machine. The rotatable machine includes a rotor at least partially surrounded by an engine case. The clearance gap is defined between the rotor and a radially inner surface of the engine case. Method 400 includes channeling 402 a flow of cooling fluid through a cooling fluid distribution duct circumferentially about a radially outer surface of the engine case. In the example embodiment, the cooling fluid distribution duct is thermally separated from the engine case. Method 400 also includes channeling 404 the flow of cooling fluid radially inwardly to the radially outer surface through a cooling fluid outlet hole extending through the cooling fluid distribution duct and one or more cooling runner channels coupled in flow communication to the cooling fluid outlet hole. The cooling fluid distribution duct and the one or more cooling runner channels are aligned axially. Method 400 also includes maintaining a predetermined spacing between the cooling fluid distribution duct and the engine case. Method 400 also includes insulating the predetermined spacing between the cooling fluid distribution duct and the engine case using at least one of air, foam, and an insulative blanket. In one embodiment, method 400 includes preventing an axial flow of cooling fluid through the cooling fluid distribution duct and the one or more cooling runner channels. In other embodiments, the radially outer surface includes one or more cooling fins extending radially outward from the radially outer surface wherein the one or more cooling fins include a base coupled to the radially outer surface and a distal end extending radially outwardly. Method 400 includes directing the flow of cooling fluid radially inwardly from the one or more cooling runner channels toward the base. In some embodiments, the one or more cooling fins and cooling runner channels are interdigitated and method 400 includes directing the flow of cooling fluid radially inwardly from the one or more cooling runner channels toward a respective base of the one or more bases.

The above-described cooling fluid distribution duct assembly provides an efficient method for supplying cooling air to an active clearance control system of gas turbine engine turbine. Specifically, the above-described cooling fluid distribution duct assembly receives a flow of cooling air from a source of cooling air, such as, but not limited to a compressor bleed port. The received flow of cooling air is relatively cool compared to engine case and is useful for cooling engine case to reduce its inside diameter, which reduces a gap between the tips of blades rotating within engine case and a radially inner surface of engine case. Reducing the gap between the rotating blade tips and the engine case tends to improve efficiency and operability of the rotating machine, in this disclosure, a high pressure compressor and/or a high pressure turbine of a gas turbine engine assembly. Although described with reference to a gas turbine engine, the cooling fluid distribution system or active clearance control system and cooling fluid distribution duct assembly may also be used on other types of engines and other types of rotatable machines, such as, but not limited to gas compressor machines. By standing relatively cool cooling fluid distribution duct assembly off from the relatively hot surface until the flow of cooling fluid can be turned radially inwardly using cooling runner channels, the flow of cooling remains relatively cooler than if the cooling fluid distribution ducts and axially-oriented headers were run in intimate contact with the radially outer surface of the engine case. Additional benefit can be derived if the space between the surface of the engine case and the cooling fluid distribution duct represented by the surface stand-off distance is filled at least partially with an insulative material.

The above-described embodiments of a method and system of maintaining a cooling fluid flow to a cooling fluid distribution system, such as, an active clearance control system relatively cool while being delivered to an area where it will be distributed for cooling use provides a cost-effective and reliable means for improving a performance of the clearance control system. More specifically, the methods and systems described herein facilitate reducing an amount of heat picked up in the flow of cooling fluid from the engine case during distribution of the flow of cooling fluid about the engine case. As a result, the methods and systems described herein facilitate improving an ability of the ACC system to maintain proper clearances in the gas turbine engine in a cost-effective and reliable manner.

Exemplary embodiments of cooling fluid distribution duct assemblies are described above in detail. The cooling fluid distribution duct assemblies, and methods of operating such systems and component devices are not limited to the specific embodiments described herein, but rather, components of the systems and/or steps of the methods may be utilized independently and separately from other components and/or steps described herein. For example, the methods may also be used in combination with other systems using a transfer of fluid flow from a relatively cool area or source past a relatively hot area to an area where the flow of fluid is desired to arrive still relatively cool, and are not limited to practice with only the systems and methods as described herein. Rather, the exemplary embodiment can be implemented and utilized in connection with many other machinery applications that are currently configured to receive and accept cooling fluid distribution duct assemblies.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cooling fluid distribution system comprising:
   a component to be cooled having a body extending along a longitudinal centerline of said component to be cooled and a radially outer surface at least partially circumscribing the longitudinal centerline;
   one or more cooling fluid distribution ducts assembly comprising a cooling fluid distribution duct extending along and spaced from said radially outer surface for a predetermined length;
   a plurality of cooling fluid outlet holes extending through said one or more cooling fluid distribution ducts circumferentially along said one or more cooling fluid distribution ducts; and
   one or more cooling runner channels coupled in flow communication with said plurality of cooling fluid outlet holes and extending from said plurality of cooling fluid outlet holes of a radially inner side of an outer surface of the one or more cooling fluid distribution ducts a distance away from said one or more cooling fluid distribution ducts toward said radially outer surface, a distal end of said one or more cooling runner channels comprising a plurality of cooling holes directed toward said radially outer surface.

2. The cooling fluid distribution system of claim 1, wherein said radially outer surface comprises one or more cooling fins comprising:
   a base coupled to said radially outer surface; and
   a distal end extending away from said body.

3. The cooling fluid distribution system of claim 2, wherein at least some of said plurality of cooling holes are directed to said base of said one or more cooling fins.

4. The cooling fluid distribution system of claim 2, wherein said radially outer surface comprises a plurality of said one or more cooling fins spaced axially and parallel with respect to each other, said one or more cooling fluid distribution ducts comprises a plurality of said one or more cooling runner channels interdigitated with said plurality of said one or more cooling fins.

5. The cooling fluid distribution system of claim 1, wherein said one or more cooling fluid distribution ducts extends circumferentially about said body, spaced from said radially outer surface for a predetermined sector of a circumference of said body.

6. The cooling fluid distribution system of claim 1, wherein said one or more cooling fluid distribution ducts assembly comprises a plurality of said one or more cooling fluid distribution ducts axially spaced with respect to each other.

7. The cooling fluid distribution system of claim 1, wherein said one or more cooling fluid distribution ducts and said one or more cooling runner channels define a flow path with a bulk flow of fluid directed in a circumferential direction and a radially inward direction toward said radially outer surface.

8. The cooling fluid distribution system of claim 1, wherein said one or more cooling fluid distribution ducts and said one or more cooling runner channels define a flow path with a bulk flow of fluid directed in other than an axial direction.

9. The cooling fluid distribution system of claim 1, wherein said one or more cooling fluid distribution ducts is spaced from said radially outer surface such that said one or more cooling fluid distribution ducts is thermally isolated from said radially outer surface.

10. A method of controlling a clearance gap in a rotatable machine, said rotatable machine including a rotor at least partially surrounded by an engine case, the clearance gap defined between the rotor and a radially inner surface of said engine case, said method comprising:
channeling a flow of cooling fluid through a cooling fluid distribution duct circumferentially about a radially outer surface of said engine case, the cooling fluid distribution duct thermally separated from said engine case; and
channeling the flow of cooling fluid radially inwardly to the radially outer surface through a cooling fluid outlet hole extending through the cooling fluid distribution duct and one or more cooling runner channels coupled in flow communication to the cooling fluid outlet hole and extending from said cooling fluid outlet hole of a radially inner side of an outer surface of the cooling fluid distribution duct, the cooling fluid distribution duct and the one or more cooling runner channels aligned axially.

11. The method of claim 10, further comprising maintaining a predetermined spacing between the cooling fluid distribution duct and the engine case.

12. The method of claim 11, further comprising insulating the predetermined spacing between the cooling fluid distribution duct and the engine case using at least one of a foam or an insulative blanket.

13. The method of claim 10, further comprising preventing an axial flow of cooling fluid through the cooling fluid distribution duct and the one or more cooling runner channels.

14. The method of claim 10, wherein said radially outer surface includes one or more cooling fins extending radially outward from the radially outer surface, the one or more cooling fins including one or more bases coupled to the radially outer surface and a distal end extending radially outwardly, said method further comprising directing the flow of cooling fluid radially inwardly from the one or more cooling runner channels toward the one or more bases.

15. The method of claim 14, wherein the one or more cooling fins and cooling runner channels are interdigitated, said method further comprising directing the flow of cooling fluid radially inwardly from the one or more cooling runner channels toward a respective base of the one or more bases.

16. A gas turbine engine comprising:
a core engine comprising an engine case and a rotor rotatable about a longitudinal centerline, said core engine comprises a high pressure compressor (HPC), a combustor, and a high pressure turbine (HPT), said HPC and HPT coupled together through a high pressure (HP) shaft;
one or more cooling fluid distribution duct assemblies comprising a cooling fluid distribution duct extending circumferentially along and spaced from a radially outer surface of at least one of said HPC and said HPT for a predetermined length;
a plurality of cooling fluid outlet holes extending through a radially inner side of said cooling fluid distribution duct along said cooling fluid distribution duct; and
a cooling runner channel coupled in flow communication with said plurality of cooling fluid outlet holes and extending from said plurality of cooling fluid outlet holes of the radially inner side of an outer surface of the cooling fluid distribution duct a distance away from said cooling fluid distribution duct toward said radially outer surface, a distal end of said cooling runner channel comprising a plurality of cooling holes directed toward said radially outer surface.

17. The gas turbine engine of claim 16, further comprising a plurality of cooling fins extending radially outwardly from said radially outer surface and axially aligned with at least one of said HPC and said HPT.

18. The gas turbine engine of claim 17, wherein said cooling fins are interdigitated with said cooling runner channel.

19. The gas turbine engine of claim 16, further comprising an insulative material positioned between said cooling fluid distribution duct and said radially outer surface.

20. The gas turbine engine of claim 16, wherein said one or more cooling fluid distribution duct assemblies is a plurality of one or more cooling fluid distribution duct assemblies, each of said plurality of cooling fluid distribution duct assemblies associated with a respective stage of the at least one of said HPC and said HPT.

* * * * *